March 20, 1945. G. P. LEISTENSNIDER ET AL 2,372,095
PACKING
Filed Sept. 24, 1942
Fig. I.
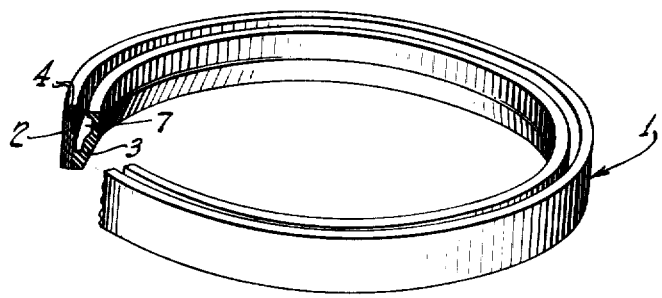
Fig. II.
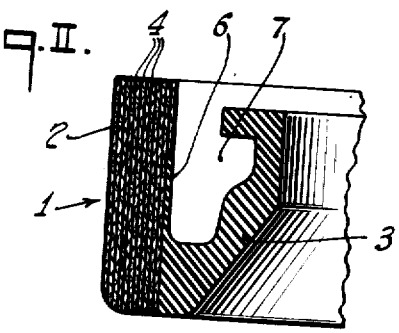
Fig. III.
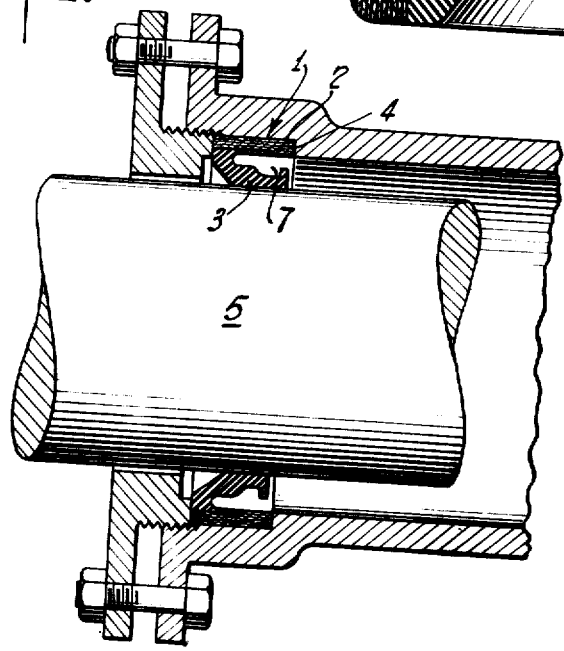
INVENTOR
GEORGE P. LEISTENSNIDER.
HERMAN G. KOCH.
BY
ATTORNEY Patented Mar. 20, 1945

2,372,095

UNITED STATES PATENT OFFICE 2,372,095

PACKING

George P. Leistensnider and Herman G. Koch, Somerville, N. J., assignors to Johns-Manville Corporation, New York, N. Y., a corporation of New York Application September 24, 1942, Serial No. 459,498

5 Claims. (Cl. 288—5)

The invention relates to packings and, more particularly, to an improved packing element having a supporting or backing portion integrally united with a lip or contacting portion.

The packing element is adapted to engage and seal against the leakage of fluids along a rotating or reciprocating rod or shaft. To insure against displacement or distortion of the lip portion of the packing which contacts the rod or shaft, a relatively stiff backing portion is provided adjacent to and united with the relatively soft contacting portion.

A material which, when formed and cured, is especially suitable for the backing portion is fabric impregnated with a heat reactive resin. Such a material, however, is not sufficiently soft, resilient, and abrasion-resistant to be used for the lip portion. A material having the necessary properties for the sealing or lip portion of a packing element, especially in conjunction with a tension member holding the lip portion against the rod or shaft, is a synthetic rubber compound so cured or treated as to have the requisite softness and resilience for an efficient seal. It has hitherto been difficult to effectively utilize the above materials in combination for a packing element as the resin-impregnated fabric does not easily bond or unite with synthetic rubber. The invention has overcome this difficulty by providing means for integrally uniting the resin-fabric backing portion and synthetic rubber lip portion.

It is an object of the invention to provide a packing or sealing element having a relatively soft contacting portion supported by a relatively stiff backing portion adjacent to and securely united with the contacting portion.

It is a further object of the invention to provide a packing element having a relatively stiff resin-impregnated backing portion integrally united with a relatively soft synthetic rubber lip portion formed in a single molding operation.

Other objects and advantages will appear from the following description and drawing appended thereto.

In the drawing which illustrates an embodiment of the invention and in which like characters designate like parts:

Fig. 1 is a perspective view of an embodiment of the invention with a portion broken away;

Fig. 2 is an enlarged fragmentary sectional view taken transversely of the packing of Fig. 1; and Fig. 3 is a sectional view showing the packing in a stuffing box assembly.

The packing or sealing element 1 comprises a stiff backing or supporting portion 2 integrally united with a relatively soft contact portion 3. The backing portion 2 is composed of one or more layers of fabric 4 which has been previously impregnated with a heat-reactive resin, such as a thermo-setting phenolic or urea resin. Where a plurality of layers of such impregnated fabric are used, the backing portion may be formed by folding, wrapping or otherwise assembling the layers of fabric in relatively flat formation with the layers preferably extending in the axial direction where the packing is to have an annular shape. For maximum strength, the impregnated fabric should extend throughout the entire backing portion. Any fabric having the requisite strength, and which may be resin-impregnated, such as cotton, asbestos, or the like, may be used. Such fabric may be impregnated by any convenient method, as by immersing, spraying, or coating.

The contacting or lip portion 3 may be formed from any plastic suitably soft, resilient, and abrasion-resistant to provide an efficient seal against the leakage of fluids along the rod or shaft 5. Any rubber material may be used which, when cured, has the requisite properties for such a sealing lip portion and which may be firmly bonded to the fabric backing portion. Preferably, the lip portion is composed of an oil-resistant rubber compound, such as synthetic chloroprene rubber. In the finished product, a layer of the material comprising the contact portion may extend along the inner surface 6 of the backing portion, although it is preferred that it completely envelop the backing portion, as this tends to provide a soft outside surface of the backing portion without impairing its strength, and further strengthens the bond between the lip portion and the supporting portion.

In forming a packing element of this type, strips of synthetic rubber are wrapped upon a mandrel to the desired thickness. Suitable fabric is impregnated with a thermo-setting resin and permitted to dry. The treated fabric is cut into strips and wound over the layers of synthetic rubber. This assembly is then placed into a mold and subjected to heat and pressure sufficient to cure the rubber and to cause a reaction of the thermo-setting resin.

In the preferred embodiment of the invention, chloroprene rubber compound is formed into thin strips having a width approximately equal to the finished width in the axial direction, as, for example, ½ inch, and with the strips wrapped upon each other over a mandrel of the desired diameter until a thickness of approximately ⅟₁₆ inch is built up. A fabric, such as 4-oz. duck, is impregnated with a phenol formaldehyde thermo-setting resin in the B stage. The treated cloth is thoroughly dried and cut into strips of the same width as those of synthetic rubber compound. The fabric strips are then coated on one side with a chloroprene rubber cement, the thickness of the coating being from .003 inch to .008 inch. The coated fabric strips are wound over the rubber strips until the desired thickness of the packing is attained, as, for example, ⅛ inch. The assembly is then removed from the mandrel and cured for 30 to 45 minutes under 300 pounds hydraulic pressure and from 300° to 325° F., in a mold of the desired shape and size.

During the molding operation, the synthetic rubber is made sufficiently resilient and abrasion-resistant to be used for the lip portion 3 and the resin-treated fabric is reacted or "set" to form a relatively stiff backing portion 2, with the two portions securely bonded to each other.

It is important that cement of the same rubber compound used for the lip portion be applied to the surface of the fabric portion to be bonded with the lip portion. Such cement, securely united with the impregnated fabric prior to curing, is firmly bonded with the rubber lip portion during the curing operation and thus creates a single packing element from the two portions. To further increase the bond between the two portions, the fabric strips may have surface coatings thereon, comprised of a rubber cement as described in the preferred embodiment. Thus, after the molding operation, there is a layer of cured rubber extending between the layers of fabric and united with the rubber coating so that every layer of fabric is held in a matrix of rubber which envelops the entire packing and which is an extension of the lip portion. In this construction, it is necessary that the resin, as used to impregnate the fabric, be non-gassing, i. e., will not evolve gases during the molding operation.

The packing element 1 may be of any shape or configuration which will form an efficient seal against the flow of fluid pressure along a rod or shaft. In the preferred construction, an opening 7 is provided which retains a tension member adapted to maintain the sealing portion in firm contact with the rod or shaft 5.

While the conventional packing or sealing ring is formed with the contact portion on the inner diameter of the ring, it may be necessary in certain instances to use the sealing ring inside the member to be sealed. In such cases, the contact portion may be formed outside the supporting portion by merely reversing the order in which the two portions are wrapped on the mandrel and using the proper mold.

The details given above are for purposes of illustration. The invention is to be limited only by the scope of the appended claims.

What we claim is:

1. A packing comprising a relatively rigid supporting annulus comprising resin impregnated material, and a portion comprising a yieldable rubber composition for contacting a moving part, and a bonding material substantially integrally united with said contacting portion and overlying and bonded to a surface of said supporting annulus.

2. A packing comprising a relatively rigid supporting annulus comprising resin impregnated fabric, and a portion comprising a yieldable rubber composition for contacting a moving part, said contacting portion including a connecting neck, and a bonding material of similar composition to said contacting portion substantially integrally united therewith at said neck, and overlying and bonded to a surface of said supporting annulus.

3. A packing comprising a relatively rigid supporting annulus comprising resin impregnated fabric, and a portion comprising a yieldable rubber composition for contacting a moving part, and a bonding material of similar composition to said contacting portion integrally united therewith, and forming a layer surrounding said supporting annulus.

4. A packing comprising a relatively rigid supporting annulus comprising a plurality of layers of fabric, each impregnated with a heat setting resin, and a portion comprising a rubber composition for contacting a moving element, said contacting portion including a relatively narrow connecting neck, and a bonding material of similar composition to said contacting portion substantially integrally united therewith, and extending to form connected layers surrounding said supporting annulus and interposed between the fabric layers thereof.

5. A packing comprising a relatively rigid supporting annulus comprising a plurality of layers of fabric impregnated with a non-gassing, thermo-setting resin, and a contacting portion comprising oil-resistant chloroprene rubber, said contacting portion including a relatively narrow connecting neck and a bonding material comprising oil-resistant chloroprene rubber substantially integrally united with said contacting portion at said neck, and overlying and bonded to a surface of said supporting portion.

GEORGE P. LEISTENSNIDER.
HERMAN G. KOCH.